INVENTORS.
JAMES F. HORAN
CHARLES R. STANLEY
BY
Reynolds, Beach & Christensen
ATTORNEYS Oct. 25, 1960  J. F. HORAN ET AL  2,957,650
GROUND MANEUVERING SYSTEM FOR JET AIRPLANES
Filed Oct. 21, 1957  2 Sheets-Sheet 2

INVENTORS.
JAMES F. HORAN
CHARLES R. STANLEY
BY
Reynolds, Beach & Christensen
ATTORNEYS United States Patent Office 2,957,650
Patented Oct. 25, 1960

2,957,650

GROUND MANEUVERING SYSTEM FOR JET AIRPLANES

James F. Horan, Seattle, and Charles R. Stanley, Bellevue, Wash., assignors to Boeing Airplane Company, Seattle, Wash., a corporation of Delaware Filed Oct. 21, 1957, Ser. No. 691,257

14 Claims. (Cl. 244—50)

Propeller-driven airliners and similar aircraft are readily maneuvered upon the ground by control of the throttle to one or more engines and their propellers, and by control of one or both wheel brakes, and of course are provided with steerable nose wheels. Jet-driven aircraft, on the other hand, are not so readily controllable. While they may have steerable nose wheel and normal wheel brakes, their engines are not adaptable to maneuvering by developing more or less thrust. The hot blast effect on adjacent aircraft, maintenance crews and passengers, and even building structures and installations, is intolerable. Likewise, the noise is highly objectionable. It has been found that, disregarding these objections, a jet aircraft is not so readily maneuverable within a small space as is a propeller-driven aircraft. While blast barriers and protective devices can be employed for maintenance crews and perhaps for passengers, and while passenger loading and unloading may be scheduled so as not to coincide with aircraft movement in and out of the loading ramp area, these impose further limitations on the convenience and loading time of such jet aircraft. Likewise, if acoustical modification of terminal facilities is attempted or if present loading ramp areas are extended and more widely dispersed, these, too, impose limitations that are undesirable.

It appears that the most practical solution to the problem is to provide a vehicle which is itself ground borne and controllable, and which can be employed by connection in suitable manner to the jet aircraft to maneuver the latter. Tow vehicles, controllable by the rider on the ground, are objectionable for various reasons, including lack of control by the jet pilot, and accordingly it is an object of the present invention to provide a method and a dolly especially designed for the purpose which can be employed in conjunction with certain controls of the jet aircraft to effect substantially normal maneuvering of the aircraft on the ground and by the pilot, while still eliminating substantially all the undesirable features mentioned above.

The invention comprises, then, the novel method and the novel dolly as illustrated in the accompanying drawings and as will be more fully described hereinafter, and set forth in the appended claims.

In the drawings, the invention is shown in conjunction with a known jet-powered airliner and in a mechanical form which presently is preferred.

Figure 1:
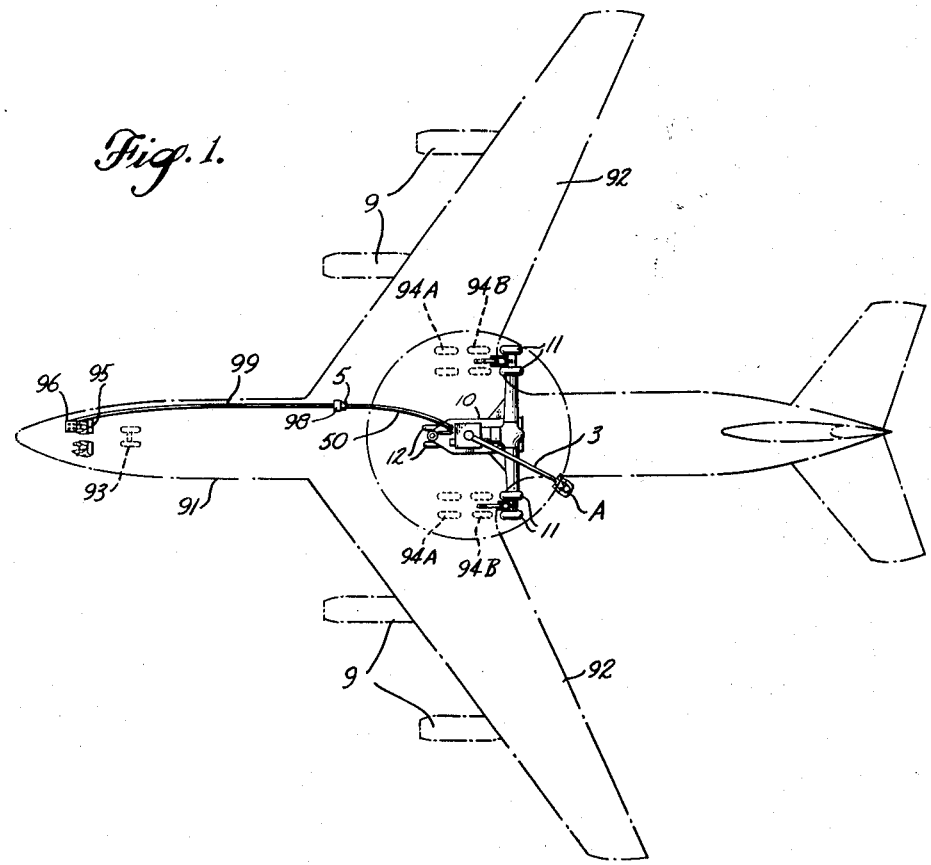
Figure 1 is a general plan view of the aircraft, shown in shadow outline only, but illustrating the relationship of the dolly and of the controls to the same.

According to the method of the present invention, the jet engines of such an aircraft may be cut off or inactive while the aircraft is ground borne, and a wheel of its main landing gear at one side, at least, but preferably at both sides, is lifted from the ground sufficiently to support a part at least of the weight of the airplane upon a wheeled dolly upon which it is lifted, and upon the nose wheel of the aircraft which remains fully resting upon the ground. The method will work most satisfactorily with an aircraft which has a tandem bogey main landing gear such that one of the tandem wheels or pairs of wheels may be lifted sufficiently upon the dolly that the latter supports at least a percentage of the wheel's load, and the other wheel of each pair is left fully in contact with the ground. This is so because these wheels of the main landing gear are provided with the principal wheel brakes of the aircraft, and it is desirable to brake the aircraft by application of its own wheel brakes while it is maneuvering on the ground. Likewise, since the nose wheel of the aircraft remains upon the ground, the aircraft is readily steerable by its normal steering means from the pilot's station, just as the pilot, at his normal station, can control the wheel brakes.

Advance over the ground, however, is effected by means of a power plant carried by the dolly and capable of driving its supporting wheels. Moreover, by a suitable connection between such power plant or its throttle and the pilot's station upon the aircraft, the pilot, from his station and by means of an auxiliary control device or panel, can control the power plant on the dolly and so can control the advance of the aircraft over the ground. Since it may be desirable at times to disengage the aircraft from the dolly in order to enable the aircraft to proceed under its own power once it is clear of installations and persons, the operative connection between the pilot's station and the dolly should include also a control for the lifting means, whereby the aircraft's lifted ground wheel or wheels can be restored to full ground contact, and the airplane can then move off from the dolly. The connection between the aircraft and the dolly can be accomplished by a means such as a plug and a socket which will pull apart upon such movement of the aircraft away from the dolly. It follows that the movement of the aircraft, and its independence of movement, are fully and wholly controllable by the pilot from his normal station.

In order that the dolly may be maneuvered into correct position for lifting the airplane, and to accomplish the initial engagement and lifting, the dolly is provided with control means for its power plant, for its lifting means, and for steering, by a walking attendant. The operative connection between the pilot's station and the dolly should also include means for disabling the dolly's steering mechanism when the aircraft is operatively connected to or lifted upon the dolly, so that the dolly's steering wheel will be freely casterable, leaving steering control to the nose wheel of the aircraft.

The invention is illustrated in the accompanying drawings more or less diagrammatically, but in a form which presently is preferred.

The airplane, shown in dot-dash shadow view, includes a fuselage 91, supporting wings 92, jet engines 9, a nose wheel 93, and two widely spread tandem bogey main landing wheels 94A and 94B at the respective sides. A pilot's station, which may be either the station of the pilot or the co-pilot, is indicated at 95. An auxiliary control panel, indicated by the numeral 96, is located conveniently to the pilot's station. The purpose and functioning of this auxiliary control panel will be made clear hereinafter.

The dolly is preferably little more than a chassis 10, supported by wheels in a polygonal (triangular, for instance) pattern, such as the wheels 11 at the opposite sides, which should be spread so that they can track behind the main landing wheels of the aircraft, and a forward wheel or dual pair, indicated by the numeral 12, at the forward end of the chassis 10, arranged for steering or for free castering, depending upon the circumstances. A power plant housed in at 2 is arranged to drive the wheels 11 through a transmission 20 and a differential gear at 21, which is connected to the wheels 11 in the normal way. An auxiliary generator for supplying power to the aircraft when its own engines are not operating may be provided at 22. The wheel 12 is mounted upon an upright post 13 and is steerable when circumstances so require, as by the jack means indicated at 14. The several functions of the dolly and its power plant and steering, and other functions to be described later, are preferably controlled from a control handle 3 mounted at 30 to swivel upon the dolly and extending to a distant point where these functions can be controlled by an attendant A, who walks along the ground behind the dolly.

The dolly includes, also, a lifting jack mechanism at the ends of the axle 15 that carries the wheels 11. Such jack means conveniently include a bell crank lever 4, pivotally mounted at 40 upon a bracket 16 extending forwardly from the axle 15, one arm of the lever 4 being arranged to engage beneath a lifting pad 97 beneath a wheel 94B, and the opposite end of the lever 4 being connected to a jack means 41 which is extensible and retractable, and which is anchored to the bracket 16 or otherwise to the chassis.

The attendant A may walk along the ground, controlling the advance of the dolly through control of its power plant 2 through the medium of the handle 3 and the controls thereon, and he may steer the dolly by control of the jack means 14, also through the medium of controls associated with the handle 3. He can thus maneuver the dolly into position immediately to the rear of the wheels 94B of the main landing gear of the aircraft. When the jack lever 4 is in correct position with regard to the pads 97, which are provided in any event upon such aircraft landing gear, he actuates the jack 41 at each side of the dolly by suitable controls, to lift the wheels 94B of the aircraft. Thus, he has lifted the weight of the aircraft in part onto the dolly. He need not lift the wheels 94B clear of the ground, for adequate control can be attained by lifting them sufficiently that the dolly assumes a percentage of the load these wheels normally bear. Obviously, he could accomplish a somewhat similar result by lifting at one side only of the aircraft, but it is preferred that the aircraft be lifted at both sides. Although he has lifted the aircraft in part from the ground, it is important, too, that he leaves part of the aircraft weight supported upon the ground and upon its own ground wheels, as for example at least the wheels 94A, for these wheels 94A, as well as the wheels 94B, will be provided with the usual wheel brakes, and by means of these wheel brakes, forward progress of the aircraft can be controlled, or it can be locked and held in a given position on the ground.

Figure 2:
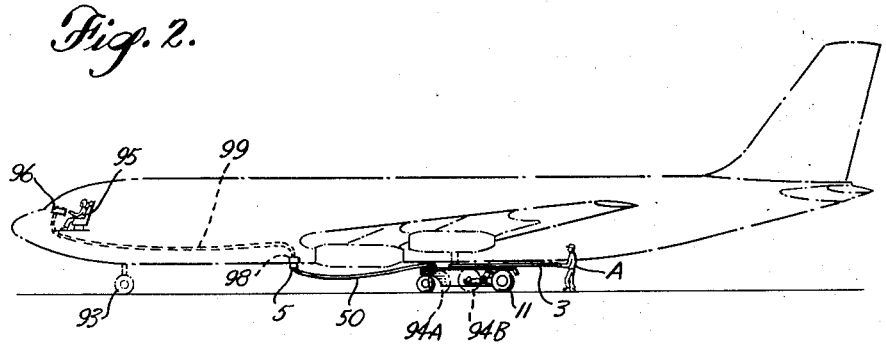
Figure 2 is a side elevational shadow view of the same.
Figure 3:
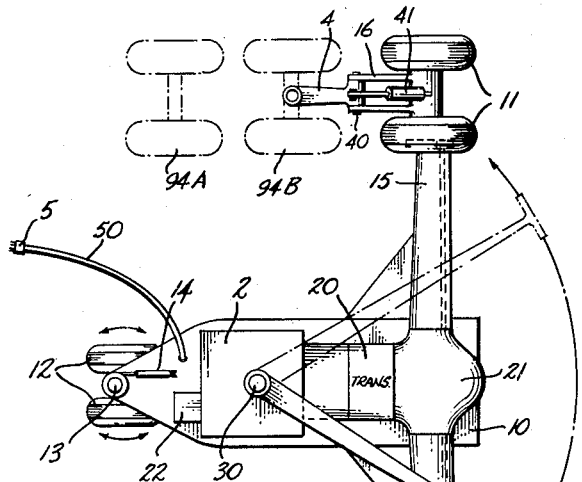
Figure 3 is an enlarged plan view of the dolly.
Figure 4:
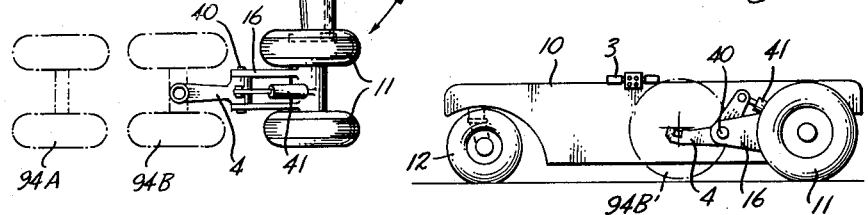
Figure 4 is a side elevational view of the same.
Figure 5:
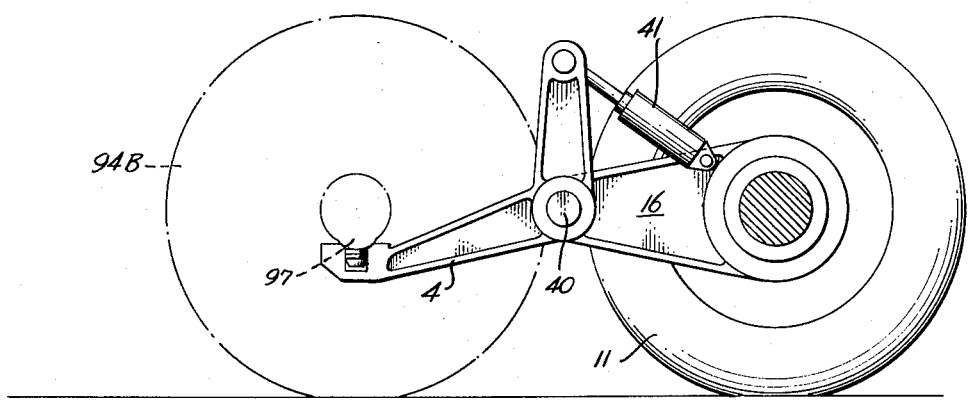
Figure 5 is a further enlarged side elevational view of the lifting mechanism which constitutes part of the dolly.

Having thus lifted the aircraft onto the dolly, the attendant proceeds to connect a plug 5, or similar connector, to a suitable socket provided in the exterior skin of the aircraft and indicated at 98 in Figure 2. The plug 5 is connected by a connector or conductor 50 to the controls upon the dolly and the socket 98 is connected by a cable 99 to the control panel 96 at the pilot's station. Through operation of selective controls on the control panel 96, which parallel those upon the handle 3, the pilot, from his station 95, is able to control the throttle of the power plant 2. Other controls at the panel 96 enable him to extend the jack 1 and thereby to deposit the lifted wheels 94B fully back upon the ground and thus to free the aircraft from the dolly. It is preferred, also, that means be provided to disable the steering jack 14 of the dolly when the dolly is operatively connected for control to the aircraft, so that the wheels 12 will caster freely about the upright pivot post 13.

Now the pilot, from his station 95, through the control panel 96, is enabled to control the power plant 2 and transmission 20, including any necessary clutch means, to advance the aircraft by means of the power plant 2 over the ground. Steering is accomplished by the normal aircraft controls acting upon the nose wheel 93, the dolly following passively. When braking is required, the pilot applies the normal wheel brakes of the aircraft and these, acting upon the wheels 94A that are still in full contact with the ground, will adequately brake the airplane, for its speed and momentum are low. Should conditions required it, the pilot, through further controls at 96, may disable the lifting jacks 41 and the wheels 94B are again set upon the ground, whereupon the pilot may start his engines 9 and move off under his own power, with full control. The plug 5 in such an instance will merely pull out of its socket 98.

We claim as our invention:

1. A method of maneuvering a ground-borne aircraft such as has a steerable nose wheel and brakable landing wheels, which comprises supporting a portion only of the weight of the airplane upon a wheeled and powered automotive dolly having controls whereby it is controllably maneuverable over the ground, by application of the dolly to the main landing gear elements, operatively connecting a control panel at the pilot's station upon the airplane with the controls of the dolly, advancing the airplane by control of the dolly by the pilot through such control connection, steering the airplane by normal control of its nose wheel, and braking the airplane by normal application of its wheel brakes.

2. A method of maneuvering a ground-borne aircraft such as has a steerable nose wheel and brakable landing wheels, which comprises controllably lifting main landing gear elements to support a part, only, of the weight of the aircraft upon a wheeled and powered dolly which has certain controls thereon, including a lifting control while leaving the aircraft nose wheel and certain landing wheels in contact with the ground, operatively connecting a control panel at the pilot's station upon the aircraft with the controls, including that for lifting, upon the dolly, advancing the aircraft by throttle control of the dolly's power plant from the pilot's station through such control connection, steering the aircraft by normal control of its nose wheel, braking the aircraft by normal control of its wheel brakes, and lowering the aircraft into full ground support, whenever the need for dolly-controlled movement is past, by control of the lifting from the pilot's control panel.

3. A method of maneuvering a ground-borne aircraft such as has main landing wheels, a steerable nose wheel or the like, and an auxiliary control panel at the pilot's station, which comprises lifting at least one main landing wheel to the extent to support a part, only, of the weight of the aircraft upon a wheeled, powered dolly equipped with controllable lifting means and with throttle means for its power plant, meanwhile leaving the aircraft supported by its nose wheel and at least in part by its main landing wheels in contact with the ground, operatively connecting the auxiliary control panel with the control for the lifting means and with the throttle means, advancing the aircraft by control of the throttle means from the pilot's station, steering the aircraft by normal control of its nose wheel, and returning the lifted landing wheel to full ground contact whenever the need for dolly-controlled movement is past, from the pilot's station.

4. A method of maneuvering a ground-borne aircraft such as includes a steerable nose wheel or the like and brakable main landing wheels as part of the main landing gear, and an auxiliary ground-maneuvering control at the pilot's station, which method comprises lifting at least one of said main landing wheels from the ground to the extent to impose a part of the weight of the aircraft upon a wheeled, powered dolly, such as incorporates controls for its functions, including a throttle control for its power plant, while leaving the nose wheel in contact with the ground, connecting the pilot's auxiliary ground-maneuvering control with the controls for the dolly, advancing the airplane by the throttle control of the dolly's power plant through such control connection, and steering the aircraft by normal control of its nose wheel.

5. A method as in claim 4, wherein a brakable wheel of the aircraft remains at all times in normal contact with the ground, the method further including braking the aircraft by normal application of its brakes.

6. A method as in claim 4, the dolly incorporating lifting means for the aircraft wheel, and the auxiliary control including control means for such lifting means, and the method including the lifting of the aircraft wheel for dolly-controlled ground-maneuvering and its lowering for normal ground maneuvering by the pilot through his auxiliary control.

7. A method as in claim 4, the aircraft main landing gear having tandem bogey wheels at each side, which method includes the relieving of one of the wheels of each main landing gear of at least a part of the aircraft's weight by lifting such wheels onto the dolly, leaving the respective tandem wheels in full contact with the ground, and braking the aircraft by braking the ground-contacting wheels by their usual controls.

8. A ground maneuvering dolly for an aircraft such as is normally supported in part upon main landing wheels, and such as incorporates ground-maneuvering controls, said dolly comprising a chassis, ground-engaging wheels thereon disposed in a polygonal pattern, at least one of which dolly wheels is steerable, power means on said chassis operatively connected to certain of its wheels to drive the same, means carried by the chassis for lifting at least part of the weight of the aircraft from at least one of its main landing wheels, and means for operatively interconnecting the ground-maneuvering controls upon the aircraft with the steerable chassis wheel and with the chassis mounted power means.

9. A dolly as and for the purpose set forth in claim 8, wherein the operatively interconnecting means includes a disconnectible operative connection intermediate the aircraft and the dolly and extending to the latter's power means for connection to the ground-maneuvering control device upon the aircraft.

10. A dolly as and for the purpose set forth in claim 8, wherein the operatviely interconnecting means includes a disconnectible operative connection intermediate the aircraft and the dolly, and extending to the latter's lifting means, for connection to the ground-maneuvering control device upon the aircraft.

11. A dolly as and for the purpose set forth in claim 8, wherein, the operatively interconnecting means includes a disconnectible operative connection intermediate the aircraft and the dolly and extending to each of the latter's power means and lifting means, for connection to the ground-maneuvering control device of each thereof upon the aircraft.

12. A ground maneuvering dolly for aircraft as set forth in claim 8, including a handle carried by the dolly and flexibly connected to the dolly's steerable wheel and power means, said handle extending away from the chassis for manipulation by a walking attendant.

13. A ground maneuvering dolly for aircraft such as includes laterally spaced landing wheels and a third longitudinally spaced wheel, said dolly comprising a low, broad chassis, ground-engaging wheels at the opposite side of said chassis, a steerable wheel located at the apex of a triangle including the first two wheels, a jack carried by the dolly adjacent each of the first two wheels, in position for engagement beneath the opposite landing wheels of the aircraft, power means carried by the chassis and operatively connected to said first two ground-engaging wheels to drive them, and control means for said power means extending to a distant point.

14. A ground maneuvering dolly as set forth in claim 13, wherein the steerable wheel is also freely casterable, a steering control distant from said steerable wheel, and means for connecting and disconnecting at will said steering control from said steerable wheel.

References Cited in the file of this patent

UNITED STATES PATENTS

| | | |
|---|---|---|
| 2,366,892 | Donellan | Jan. 9, 1945 |
| 2,409,552 | Donellan | Oct. 15, 1946 |
| 2,539,010 | Cox | Jan. 23, 1951 |